Dec. 15, 1942.                H. HELLAN                2,305,351
                      LIQUID STRAINING APPARATUS
                        Filed May 27, 1940            2 Sheets-Sheet 1

INVENTOR.
HAAKON HELLAN
BY
ATTORNEY.

Patented Dec. 15, 1942

2,305,351

UNITED STATES PATENT OFFICE 2,305,351

LIQUID STRAINING APPARATUS

Haakon Hellan, Cleveland Heights, Ohio

Application May 27, 1940, Serial No. 337,486

3 Claims. (Cl. 210—167)

This invention relates to liquid strainers, and more particularly to a new and improved strainer for removing foreign matter and sediment from liquids passing or flowing through pipe lines.

Heretofore, many different types of strainers have been provided for the purpose of removing foreign matter from flowing liquids. However, such strainers embodied many undesirable features from both an operating as well as a manufacturing standpoint. For example, the complicated constructions of prior strainers were relatively costly to manufacture and maintain or service. These strainers, due to their inherent construction, were not particularly efficient in straining liquids in that the straining screen so employed was susceptible of becoming rapidly clogged with sediment and was also susceptible to damage by relatively large objects carried along by the flowing liquid. Furthermore, the screens could not be readily, easily or efficiently cleaned after they had become clogged or choked with foreign material.

By the present invention, there is provided a new and improved strainer construction which overcomes the aforementioned drawbacks of prior liquid straining devices and is simple and economical to manufacture and operate. The strainer efficiently removes foreign material and sediment from liquids which are adapted to pass therethrough, depositing such material in a pocket or space remote from the vicinity of the screen. The strainer, moreover, embodies new and improved means for protecting the screen against damage by relatively large objects carried along by the liquid, together with means for cleaning the outer surface and the perforations of the screen without seriously impeding the free flow of liquid through the strainer.

Figure 1:
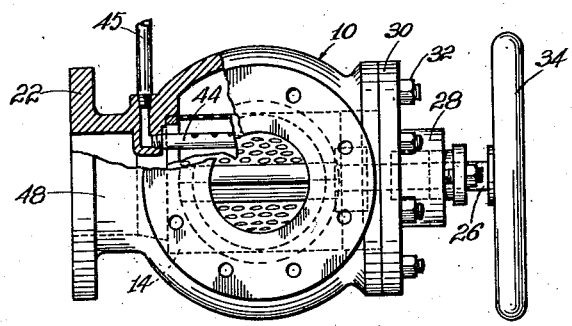
Figure 2:
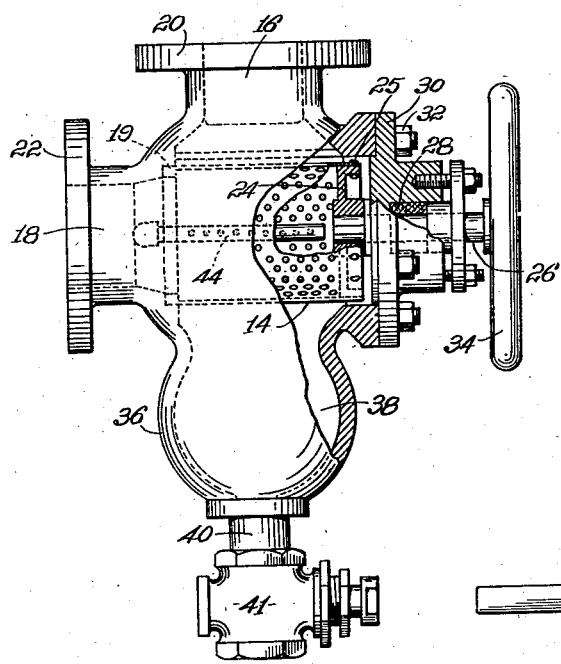
Figure 3:
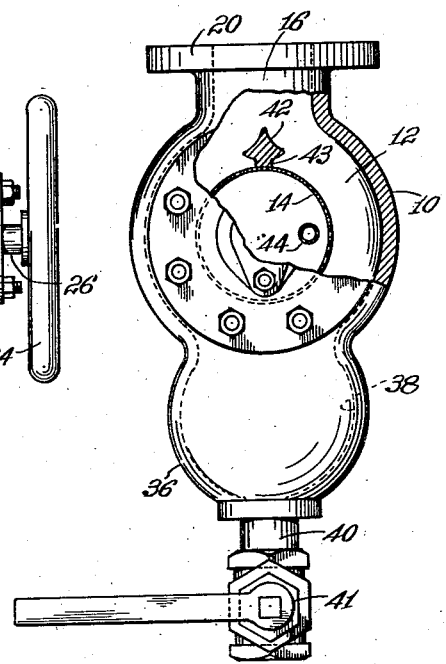
Figure 4:
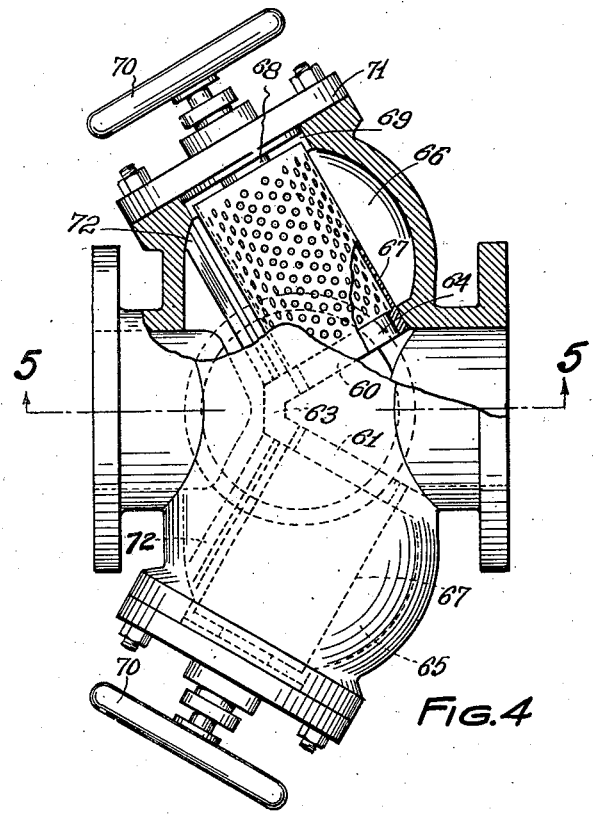
Figure 5:
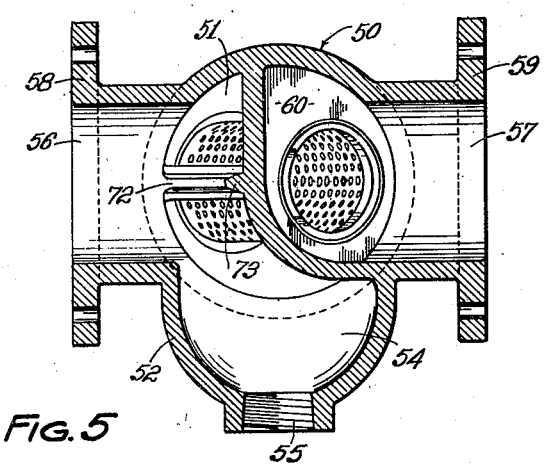

Various objects of the invention will become more apparent and better understood after consideration has been given to the following detailed description of the invention, taken in conjunction with the accompanying drawings, wherein:

Figure 1 is a top plan view, partly broken away, of a strainer constructed according to the present invention, Figure 2 is a side elevational view, partly broken away and in section, of the device of Figure 1, Figure 3 is an end elevational view, partly broken away, Figure 4 is a top plan view, partly broken away and in section, of a modified strainer construction, embodying the present invention, and, Figure 5 is a sectional view, taken on the line 5—5 of Figure 4.

With reference to Figures 1 to 3, inclusive, of the drawings, wherein there is illustrated apparatus constructed according to the present invention, the numeral 10 designates a casing or housing through which liquids to be strained are caused to flow. The casing 10 is formed with an enlarged central chamber 12 in which there is mounted a perforated cylindrical screen 14. The chamber 12 is provided with an inlet opening 16 extending substantially normal to the axis of the screen 14 and an outlet opening 18 disposed in alignment with the axis of the screen. The inlet and outlet openings are provided with peripheral flanges 20 and 22, respectively, for attaching the casing of the strainer to the ends of conduits in the usual manner.

The screen 14 is mounted for rotary movement within the chamber 12, one end of which is open and in alignment with the outlet opening 18. An annular seat 19 is formed in the casing wall at the inner extremity of the outlet opening 18 and receives the open end portion of the screen 14 providing therefor a supporting and bearing surface. The opposite end of the screen 14 has mounted therein a spider element or disc 24 to which the screen is adapted to be attached in any suitable manner, for example, by welding or rivets 25. The spider element 24 is secured to the end of an actuating shaft 26 which extends outwardly through a stuffing box 28 carried in a head plate 30. The head plate 30 is secured to the casing 10 by means of a plurality of stud bolts 32. For actuating the shaft 26 a hand wheel 34 is mounted on the outer end thereof.

Below the screen 14 the casing 10 is formed with a hollow substantially spherical enlargement 36 defining a pocket 38, into which sediment and other foreign material is deposited upon being separated from the flowing liquid by the screen 14. The bottom of the sediment collecting pocket 38 is provided with a discharge opening communicating with a conduit 40, in which there may be disposed any suitable type of valve mechanism 41.

Traversing the upper portion of the chamber 12 adjacent the inlet opening 16 and integrally formed with the casing 10 is a rib 42. The lower portion of the rib is formed with a scraping surface 43 which operatively engages the exterior surface of the screen 14. The rib 42 extends across the inlet opening 16 and is formed with inclined surfaces which serve to intersect and deflect the stream of liquid flowing into the chamber 12 so that it strikes the outer surface of the cylindrical screen substantially at a tangent thereto.

For facilitating the cleaning of the perforations of the screen 14 and removing any material which may have become wedged or choked therein, there is provided a perforated nozzle 44 extending into the interior of the cylindrical screen 14 and in close proximity to the inner wall of the screen. The nozzle 44 is connected to any suitable source of steam under pressure by means of a conduit 45.

In the operation of the strainer shown in Figures 1 to 3, inclusive, of the drawings, liquid is caused to enter the strainer through the inlet opening 16. As the flow of liquid enters the chamber 12, it is intersected by the rib 42 and deflected tangentially in two streams about the cylindrical straining screen 14. Any large objects which may be carried along by the flowing liquid are thereby prevented from directly striking and damaging the cylindrical screen. These and other particles of foreign material which are of the size which the straining screen is designed to separate from the liquid are washed around the cylindrical straining screen into the region therebelow, and then, being no longer supported by the flowing liquid, drop into the sediment collecting pocket 38. The fluid passes through the perforations into the interior of the screen and thence out through the outlet opening 18.

Such particles of foreign material and sediment which adhere to the exterior surface of the screen and choke or clog the perforations of the screen may be quickly and easily removed by rotating the screen 14 in either direction by means of the hand wheel 34, whereby the surface of the screen is made to pass under the scraping surface 43 of the rib 42. The thus loosened material is carried by the streams of fluid passing about the screen and deposited in the sediment collecting pocket 38. Those particles as are lodged within the apertures of the screen are removed by the nozzle 44 which is adapted to project streams of steam or other suitable medium under high pressure against the inner surface of the screen.

Whereas the strainer illustrated in Figures 1 to 3 is most conveniently used at a turn in a pipe line where the inflow of liquid into the strainer is at substantially right angles to the flow of liquid therefrom, the modified strainer construction illustrated in Figures 4 and 5 is employed in a straight line of pipe, the inlet and outlet openings of the strainer being in substantial alignment. The modified strainer construction comprises a casing 50 defining an enlarged chamber 51 formed symmetrically about the longitudinal axis of the device and provided with a substantially cylindrical enlargement 52 below the chamber 51 defining a sediment receiving pocket 54 provided with a discharge opening 55. Casing 50 is provided with an inlet opening 56 and an outlet opening 57 suitably formed with flanges 58 and 59, respectively, for purposes of securing the casing 50 in a pipe line in the usual manner.

Projecting outwardly from each side of the inner wall of the casing 50 adjacent the outlet 57 are wall members 60 and 61 which terminate in a wall 63 positioned in the central part of the chamber 51. The wall 63 is extended downwardly and curved toward the outlet 57, connecting with the lower extremities of the walls 60 and 61 separating the outlet 57 from direct communication with the chamber 51. The walls 60 and 61 are provided with openings 64 to provide communication between the chamber 51 and outlet 57. The wall members 56 and 57 serve to substantially divide the chamber 51 into two straining compartments 65 and 66 which are identical in construction, and for simplification, only one of such compartments will be described herein.

Mounted in the compartment 66 is a cylindrical perforated strainer 67 having one end thereof rotatably mounted and supported in the opening 64 in the wall 60. The other end of the strainer is secured in any suitable manner to an actuating shaft 68 which extends outwardly through an opening 69 in the casing 50 and terminates in a hand wheel 70. A head plate 71 serves to close the opening 69.

Extending transversely of the straining compartment 66 between the wall 60 and the casing 50 is a rib 72 having one surface thereof so formed and positioned as to engage the exterior surface of the perforated screen 67 and serve as a scraper element therefor. That portion of the rib facing the inlet opening 56 is formed with inclined surfaces 73 which serve to intersect and deflect the stream of liquid flowing into the compartment 66 from the inlet opening 56 in such a manner that it washes over the exterior surface of the screen rather than directly striking the same.

In the operation of the modified strainer shown in Figure 4 and 5, liquid is caused to enter the chamber 51 through the inlet opening 56, where it is deflected by the wall 63 in the straining compartments 65 and 66 on each side thereof. As the flow of liquid enters the chambers 65 and 66, it is intersected by the ribs 72 and deflected tangentially in two streams about the cylindrical screens 67. The particles of sediment and the like which are separated from the flowing liquid by the screens 67 fall into the sediment collecting pocket 54 from which they may be removed through the discharge opening 55. The strained fluid passes into the interior of the screens 67 and outwardly through the open end thereof into the outlet 57.

Such particles of sediment and other foreign material which may adhere to the exterior surface of the screens 67 and clog the perforations thereof is quickly and easily removed by rotating the screens in contact with the scraping surfaces of the ribs 72 by means of the hand wheels 70. The dislodged material readily falls into the sediment collecting pocket 54. Where desired, the screens 67 may be provided with nozzles similar to nozzles 44 shown in Figures 1 and 2 for purposes of projecting steam or other suitable medium against the inner surface of the screen for cleaning the perforations which become choked with sediment.

Having thus described my invention, what I desire to secure by Letters Patent is defined in the appended claims.

I claim:

1. A strainer for flowing liquids comprising a casing having a chamber therein, aligned inlet and outlet openings for said chamber, converging wall means extending from the outlet opening into said chamber and defining a plurality of straining compartments, said wall means having openings therethrough for effecting communication from said chamber to said outlet, substantially horizontally disposed perforated cylindrical screens rotatably mounted in said straining compartments with the open ends thereof journaled in the openings of said wall means, said casing having an enlargement defining a sediment collecting pocket below said chamber and opening thereinto, and rib members extending between said wall means and casing disposed between the screen and the inlet opening and extending parallel with the longitudinal axis of the screen whereby the flow of fluid into the straining compartments from said inlet opening will be deflected tangentially over the exterior surfaces of the screens and the sediment separated therefrom will be directed into the sediment collecting pocket by the fluid flow.

2. A strainer for flowing liquids comprising a casing defining a chamber, inlet and outlet openings for said chamber, converging wall means extending from the outlet opening into said chamber and separating said chamber into a plurality of fluid straining compartments, said wall means having openings therethrough for effecting communication between said chamber and said outlet opening, said casing having an enlargement defining a sediment collecting pocket communicating with the bottom of said chamber, perforated cylindrical screens positioned in said straining compartments with the open ends thereof supported in the openings of said wall means, scraping means integrally formed with said casing and adapted to engage the exterior surface of said cylindrical screens, and means for rotating said screens within said straining compartments.

3. A strainer for flowing fluids comprising a casing defining a chamber, inlet and outlet openings for said chamber, converging wall means extending from the outlet opening into said chamber and defining a plurality of fluid straining compartments, said wall means having openings therethrough for effecting communication between said chamber and said outlet opening, said casing having an enlargement defining a sediment collecting pocket communicating with the bottom of said chamber, substantially horizontally disposed cylindrical screens positioned in said straining compartments with the open ends thereof journaled in the openings in said wall means, scraping means rigidly formed with said casing and adapted to engage the exterior surface of said cylindrical screens, means for rotating said screens within said straining compartments, and rib members extending between said casing and said wall means intersecting the passages from the inlet opening to said screens and extending parallel with the longitudinal axis of the screen serving to deflect the flow of fluid tangentially over the exterior surfaces of the screens.

HAAKON HELLAN.